United States Patent [19]

Le Devehat

[11] Patent Number: 5,193,572
[45] Date of Patent: Mar. 16, 1993

[54] PIG-COMPATIBLE THREE-WAY BUTTERFLY VALVE

[75] Inventor: Eugene Le Devehat, Saligny, France

[73] Assignee: FMC Corporation, Chicago, Ill.

[21] Appl. No.: 904,792

[22] Filed: Jun. 26, 1992

[30] Foreign Application Priority Data

Jun. 27, 1991 [FR] France ................. 91-07952

[51] Int. Cl.[5] .............................................. B08B 9/04
[52] U.S. Cl. .................................... 137/244; 137/268; 251/298; 251/305; 15/104.062
[58] Field of Search ............... 137/238, 242, 244, 268; 251/298, 305; 15/3.5, 3.51, 104.062

[56] References Cited

U.S. PATENT DOCUMENTS

| | | | |
|---|---|---|---|
| 1,006,260 | 10/1911 | Mueller et al. | 15/104.062 |
| 1,242,621 | 10/1917 | Watkins | 251/305 |
| 2,363,177 | 11/1944 | Haffner | 137/263 X |
| 3,042,360 | 7/1962 | Sneddon | 251/298 X |
| 3,539,150 | 11/1970 | Conrad | 251/298 X |
| 4,073,303 | 2/1978 | Foley, Jr. | 15/104.062 X |
| 4,467,826 | 8/1984 | Lorentz | 137/263 X |
| 4,597,415 | 7/1986 | Gieseke | 251/298 X |
| 5,035,256 | 7/1991 | Le Devehat | 15/104.062 X |
| 5,049,063 | 9/1991 | Kishida et al. | 431/78 |
| 5,113,895 | 5/1992 | Le Devehat | 137/244 |

FOREIGN PATENT DOCUMENTS 3517751 11/1986 Fed. Rep. of Germany .
483974 2/1970 Switzerland .

Primary Examiner—John Rivell
Attorney, Agent, or Firm—Lawrence Cruz; Richard B. Megley

[57] ABSTRACT

A pig-compatible three-way valve designed to be mounted on a fluid transfer conduit for use in oil or petroleum distribution or similar operations. The valve includes a tee-shaped tubular passageway and a valve closure element mounted on a control shaft for controlling fluid flow.

18 Claims, 3 Drawing Sheets

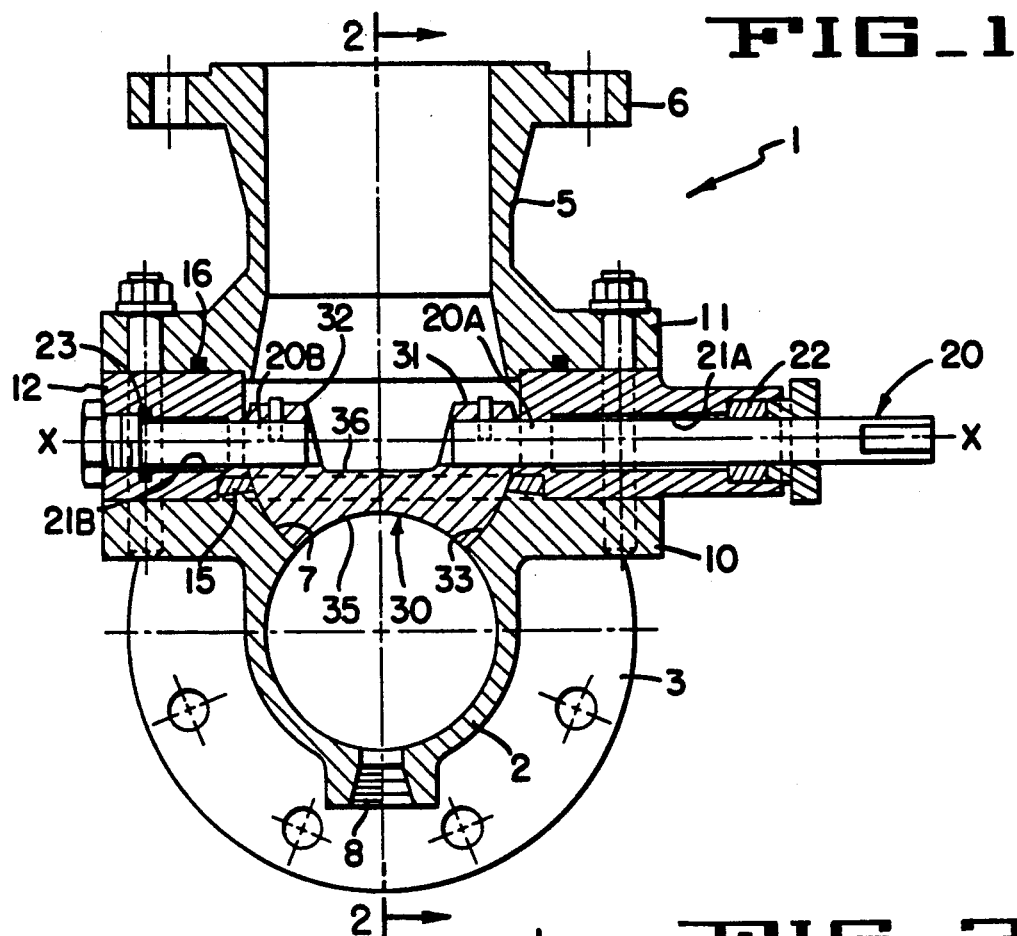
FIG_1
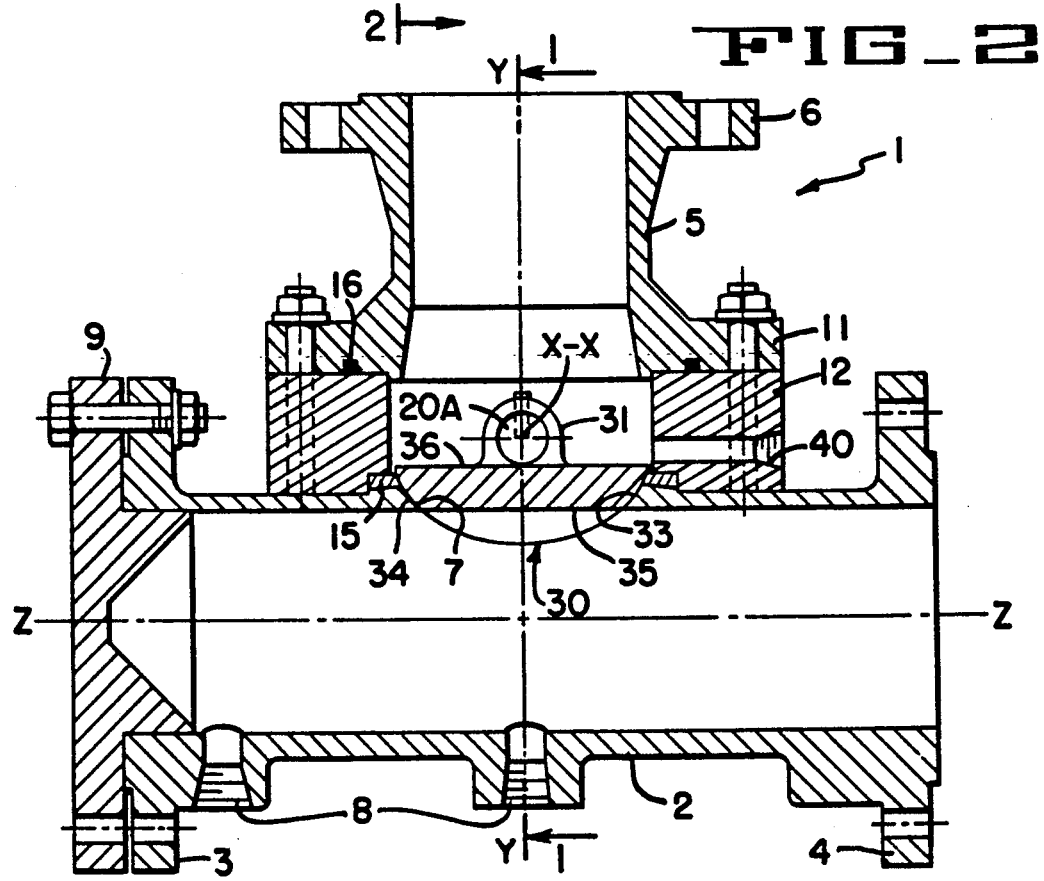
FIG_2

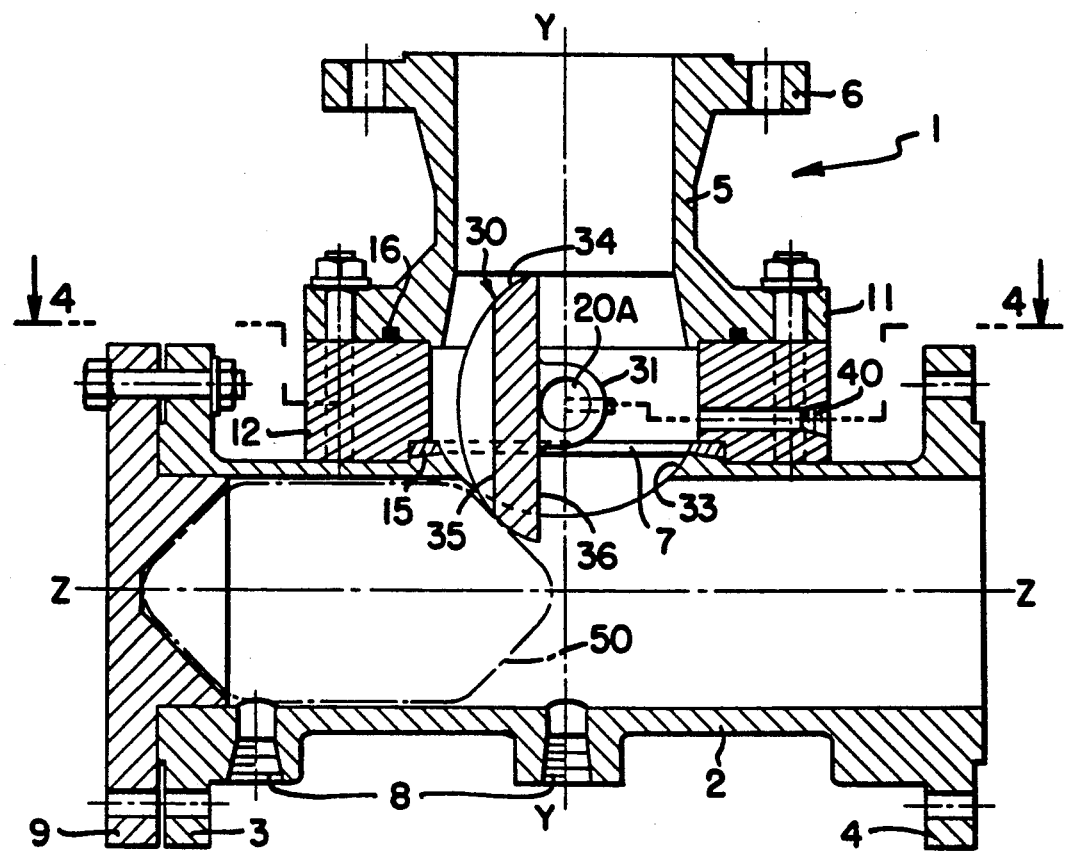
FIG_3
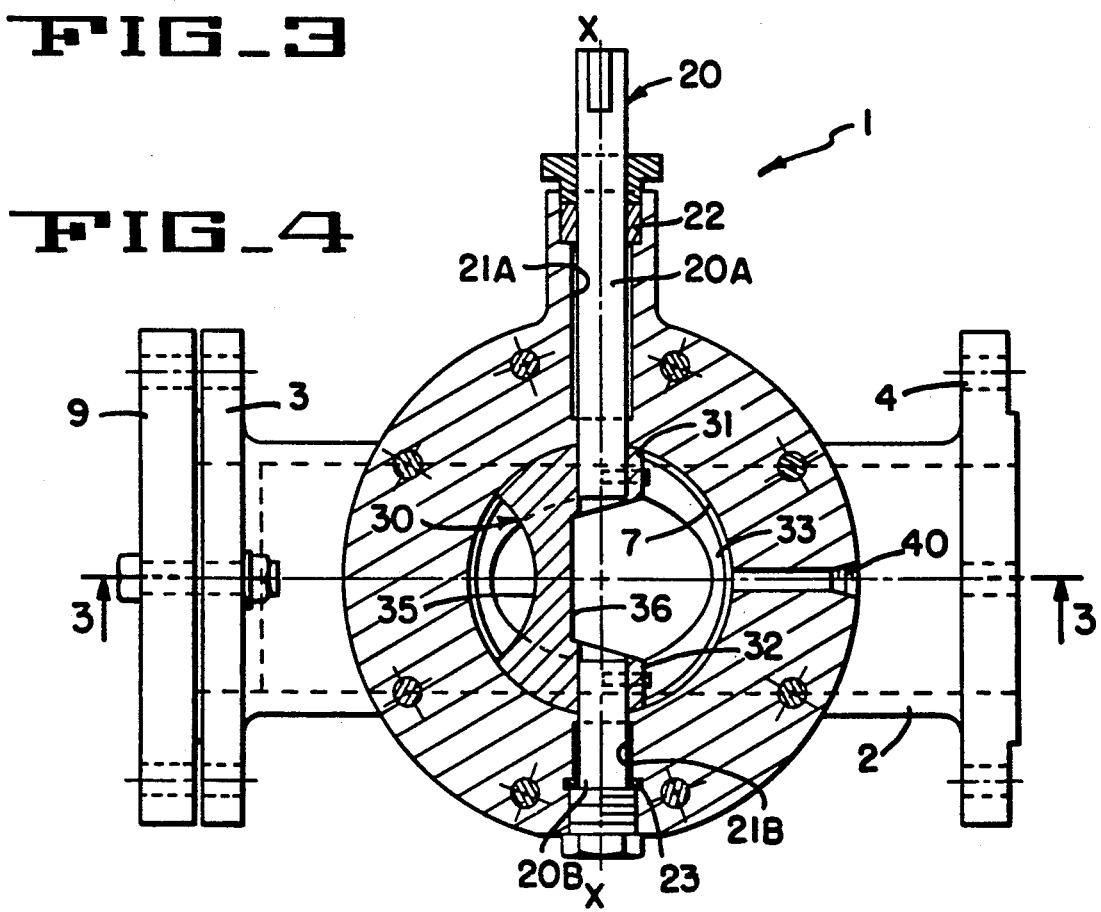
FIG_4

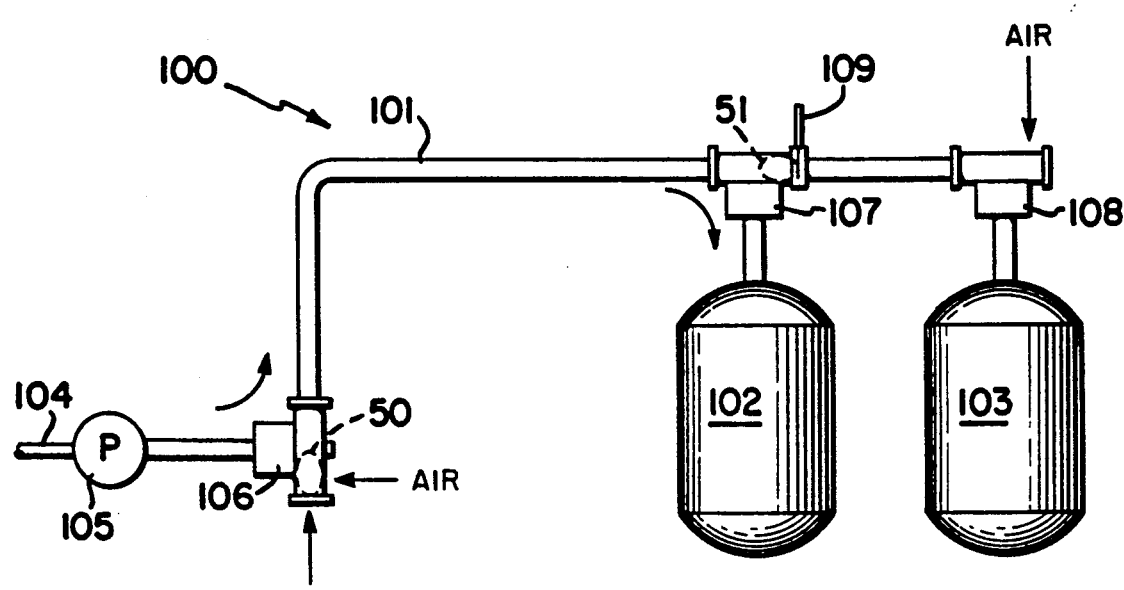
FIG_5

PIG-COMPATIBLE THREE-WAY BUTTERFLY VALVE

BACKGROUND OF THE INVENTION

This invention concerns butterfly valves, and more particularly a pig-compatible three-way butterfly valve designed to be used in a fluid transfer conduit, for example in oil or petroleum product pipelines or other distribution installations.

As is known, a conduit is "pig-compatible" if a pipeline pig can be passed through it, a pipeline pig being a closure device designed to seal off the entire internal section of the conduit and to move through the conduit under the pressure of a propulsion gas such as air or nitrogen. This results in the pig removing the products remaining in the conduit, without these products becoming mixed with the propulsion gas. Emptying the conduit in this way also accomplishes cleaning of the internal walls of the conduit.

This pigging capability has two main advantages. First, it allows the conduit to be used for successive transfer of several fluid products without their becoming mixed. Second, it provides the means for an optimum and complete transfer of a given quantity of a given product, without loss in the conduit. It will be appreciated that these results cannot be obtained satisfactorily by use of air or gravity alone to evacuate the conduit.

Several types of pipeline pigs are known, including bidirectional pigs that are adapted to run in both directions. This is particularly advantageous in the case of "closed" conduits (sealed at the ends) in which case the pigs are captive. Such "closed" conduits communicate via three-way valves with one or more fluid inlet conduit(s) and one or more fluid outlet conduit(s), and effective pigging of these lines requires the pig to be able to pass through these three-way valves; thus these three-way valves must be "pig-compatible" at two of their three ports.

Pig-compatible three-way valves are tee-shaped with two of the three ports, i.e. those through which a pig must pass, aligned to thereby jointly constitute the crossbar of the tee, while the third port constitutes the vertical bar of the tee. A closure element is provided in this vertical bar either to allow this third port to communicate with the two pig-compatible ports or, on the contrary, to isolate it, as required. In the closed configuration, the closing element of such valves must seal off the two pig-compatible ports from the third port, while in the open configuration it must introduce as low a pressure drop as possible.

Several types of pig-compatible three-way valves are currently known. In one the closure element consists of a sliding cylinder of greater internal diameter than the crossbar of the tee. In another the closure element is a ring of the same internal diameter as the crossbar of the tee but mobile in a direction transverse to the latter.

These two types of valve have the disadvantage of generating a notable pressure drop in the open configuration, particularly in the second type of valve. In addition, the first type of valve has the disadvantage of allowing volumes to subsist that are not accessible to the pigs, thereby constituting sources of contamination, while use of the second type of valve soon results in sealing failure because of unavoidable degradation of the gaskets. A third type of such valve has a hollow ball closure element but this valve, although it provides an excellent seal and introduces only a moderate pressure drop, nevertheless leaves a volume, albeit moderate, not accessible to the pig.

SUMMARY OF THE INVENTION

The object of the present invention is to overcome the above mentioned disadvantages by providing a pig-compatible three-way valve which, in its closed condition, offers a high quality seal combined with the absence of any non-pig-compatible space in the crossbar of the tee and which, in the open condition, generates only a moderate pressure drop. An additional object is to allow, in its closed condition, effective drainage of the entire vertical bar constituting the third port.

For this purpose the invention comprises a tee-shape pig-compatible three-way valve incorporating a pig-compatible tubular main section, a tubular secondary section generally perpendicular to this pig-compatible main section and communicating therewith through a radial opening in said main section, and a movable closure element mounted on a rotatable control shaft positioned transverse to the secondary section close to the opening in the main section, the closure element rotatable between a closed position in which the closure element seals off the secondary section from the main section, and an open position in which the two sections are in flow communication. More specifically, in the preferred embodiment the opening in the main section comprises an intersection of the internal cylindrical surface of said main section with a seat surface formed by a portion of a sphere centered on the intersection of the axis of the control shaft, with the axis of the secondary section at a distance from the axis of the main section less than the sum of the internal radius of the main section and the radius of said portion of a sphere. Further, in the preferred embodiment the closure element is a solid butterfly-type disk that is offset with respect to the axis of the control shaft, that has an edge formed from a portion of a sphere concentric with the surface forming the seat and with a diameter, allowing for clearance, equal to this seat-forming surface, and that has an outer surface facing the inside of the main section, which outer surface is a concave portion of a cylinder of the same diameter as the internal cylindrical surface of the main section and with an axis situated with respect to the control shaft at the same distance and at the same inclination as the axis of the main section. Accordingly, in its closed position the disk completely seals off the opening by locally completing the internal cylindrical surface of the tubular section.

Further objects, characteristics and advantages of the invention will become apparent from the following description, given by way of non-limiting example only, with reference to the appended drawings.

BRIEF DESCRIPTIONS OF THE DRAWINGS

FIG. 1 is a transverse sectional view along the line 1—1 of FIG. 2, of a valve in accordance with the invention, in its closed condition.

FIG. 2 is a longitudinal sectional view of the valve along the line 2—2 of FIG. 1.

FIG. 3 is a longitudinal view along the line 3—3 of FIG. 4 showing the valve in its open condition.

FIG. 4 is a plan view, partially in section, along the line 4—4 of FIG. 3.

FIG. 5 is a diagram of a fluid transfer conduit equipped with three valves in accordance with the present invention.

DESCRIPTION OF THE PREFERRED EMBODIMENT

As illustrated in FIGS. 1 to 4, a tee-shaped pig-compatible three-way valve 1 in accordance with the present invention comprises a pig-compatible tubular main section 2 with a pig-compatible port at each end, two internal transverse mounting flanges 3 and 4, and a tubular secondary section 5 with a mounting flange 6 at one end and connected at its other end to the main section 2 opposite an opening 7 in the wall of this main section. The main section 2 includes one (or more) orifice(s) 8 adapted to be connected to a source of compressed air or any other appropriate pressurized fluid. A sealing plate 9, shown bolted to the flange 3, can be used to block off one end of the main section 2.

The connection of the secondary section 5 to the main section 2 is provided by a mounting flange 10 (see FIG. 1) integral with the main section 2 and surrounding the opening 7, a mounting flange 11 integral with the secondary section 5, and an intermediate flange 12 clamped between flanges 10 and 11 and coaxial with them, these elements 10, 11 and 12 secured together by bolts. Annular gaskets 15 and 16 are disposed at the interfaces between the flanges 10, 11 and 12. Preferably, but not necessarily, the interface between the flange 12 and flange 10 is at a tangent to the outer wall of the tubular main section 2.

Diametrically opposite the flange 12 is a control shaft 20 connected to a control unit such as, for example, a rotary electric motor (not shown) of any appropriate known type. The shaft 20 is disposed transversely to the tubular sections 2 and 5, and is advantageously formed from two sections 20A and 20B pivotally disposed in two diametrically opposite bores 21A and 21B in the flange 12 and sealed to these bores by gaskets 22 and 23.

To the control shaft 20 is secured an eccentric (or offset) butterfly-type disk 30 fitted with lugs 31 and 32 connecting it to the two shaft sections 20A and 20B. The advantage of the disk 30 being eccentric with respect to the axis X—X of the shaft 20 is that this arrangement impedes the flow of liquid as little as possible in the open position (FIGS. 3 and 4), yet allows the valve to be sealed by positioning the seal 15 as close as possible to the main section 2.

The opening 7 is defined by the intersection of the inner surface of the cylindrical wall of the main section 2 with an annular surface 33 in the shape of a portion of a sphere that functions as a seat for the disk 30. This portion of a sphere is centered at the intersection of the axis X—X of the control shaft 20 and the axis Y—Y of the secondary section 5, and is close enough to the axis Z—Z of the main section 2 so that the seat surface 33 provides an adequately sized opening 7, allowing for the disk 30, to avoid generating an unacceptable pressure drop. Those skilled in the art will be able, taking into account a predetermined pressure drop limit, to select appropriate values for the above mentioned diameter and distance. In the preferred embodiment the area of the opening 7 is between 45 and 65% of the transverse area of the main section 2, and the distance between the axis X—X of the control shaft 20 and the axis Z—Z of the main section 2 is preferably between 75 and 85% of the internal diameter of the main section 2.

The diameter of the seat surface 33 is preferably selected to be greater than the internal diameter of the main section 2. In practice, the pig-compatible conduits most frequently encountered have diameters of between approximately 50 and 150 mm and are in fact denoted by references ND 50, ND 80, ND 100 and ND 150, where ND indicates Nominal Diameter and where the figures are the approximate measurements in millimeters of the internal diameters of the internal conduits, that is approximately 2, 3, 4 and 6 inches. The internal diameter of the intermediate flange 12 is then established at between 20 and 30 mm (approximately one inch) greater than that of the pig-compatible tubular section 2. The surface 33 preferably has a diameter between 110 and 150% (ideally between 125% and 135%) of the internal diameter of the section 2. Valves in accordance with the present invention are not limited to the foregoing sizes, but also can be of much larger size, such as 8 to 16 inches or more in diameter, and still provide all the advantages of the invention.

In the closed configuration (FIGS. 1 and 2) a seal between the disk 30 and the seat surface 33 is provided by the sealing ring 15 which also provides a seal at the interface between the flange 12 and the flange 10. The shape of the disk 30 is designed to completely block the opening 7 by perfectly completing at this point the cylindrical internal surface of the main section 2. The disk 30 has a section or edge 34 shaped as a portion of a sphere, with the same center as that of the seat surface 33 and of a diameter slightly less than that of the surface 33 to obtain the clearance necessary for free rotary movement of the disk around the axis X—X of the control shaft 20, while avoiding any product retention between the surfaces 33 and 34.

The outer face 35 of the disk 30, that is the face opposite the axis X—X, is concave, comprising a portion of a cylinder the axis of which is coaxial with the axis Z—Z when the disk is in its closed position in the valve, and the diameter of which is equal to the internal diameter of the tubular main section 2. In this way, in the closed position the surface 35 perfectly matches the cylindrical internal surface of the section 2. The shape of the inner face 36 of the disk 30, that is, the face opposite the axis X—X, is not critical, and can be flat as shown.

It will be appreciated that because of the shape and location of the disk 30, no non-pig-compatible space remains in the tubular section 2 when the disk is in its closed position. In addition, the seal between the sections 2 and 5 is extremely tight when the valve is closed.

In its open position (FIGS. 3 and 4) the disk 30 extends into the interior of the main section 2, preferably over approximately a quarter, or even a third, of the inside diameter of this section to provide a stop for a pig, such as that represented by the dashed line and referenced 50 in FIG. 3. This is very advantageous because the product flowing through the open valve into the section 2 tends to suck the pig 50 away from its normal rest position (FIG. 3) and carry it downstream during product transfer operations. This advantage would also be achieved, although less markedly, if the axis X—X of the control shaft were parallel to, instead of perpendicular to (as shown), the axis z—z of the section 2. This advantage and the achievement of as low a pressure drop as possible are provided in optimal fashion when the disk 30 is pivoted to a position opposite to the opening 7 into the section 2, whereby the disk can then serve as a baffle encouraging the flow across the face of the disk.

The sealing ring 15 is preferably as close as possible to the internal surface of the main section 2 in order to minimize product retention, without however extending beyond this internal surface. It is particularly for this reason that the flange 20 is advantageously at a tangent to the outer surface of the section 2 when the ring 15 is in position to provide the seal between this flange and the flange 12.

It is not essential for the inner surface of the flange 12 to be spherical in configuration, but rather it is sufficient that such inner surface facilitates free rotation of the disk 30. It is for this reason, and with a concern for simplicity, that the inner surface of the flange 12 is cylindrical but this inner surface could, of course, have another shape (spherical, tapered, etc).

Another particularly advantageous feature of the invention is the inclusion of a vent 40 in the secondary section 5 or, better still, in the flange 12 as represented in the figures. The vent 40 is adapted to be connected to a source of cleaning fluid under pressure of any appropriate known type (not represented), to allow the entire secondary section 5 (up to the opening 7) and the conduit to which it is connected to be drained if necessary. Preferably, this vent is located at a level with the inner surface of the disk 30 when the latter is in its closed position (FIG. 2).

A valve in accordance with the present invention can advantageously be used in all fluid transfer systems that may have to be drained between two transfer cycles, notably in the following cases:

products having a high viscosity, very difficult to drain by gravity or blow-through, such as grease, paint, cream foodstuffs, various liquors, etc.

products which flow only when heated and which set or crystalize when cold, such as varnish or bitumen, etc.

A valve according to the present invention is also of use in an installation such as that labelled 100 in FIG. 5, including a pig-compatible conduit 101 to fill various containers 102 and 103 with separate products carried by an inlet line 104 fitted with a pump 105. Three valves 106, 107, 108 of the foregoing described type can be used in the installation 100. A stop device 109 is provided at the outlet of the intermediate valve 107 through which a captive pig 51, held at rest by the pressure of the product or by the influence of a gas blown in the downstream valve 108, can deflect fluid product into the intermediate container 102, as indicated by the arrows.

It should be understood that the foregoing description has been by way of non-limiting example only, and that many variants can be proposed by those skilled in the art without departing from the spirit or scope of the invention.

What is claimed is:

1. A tee-shaped three-way pig-compatible fluid control valve comprising:
   a) a pig-compatible tubular main section having an axis, a longitudinal wall extending between two spaced ends, and an opening through said wall for passage of fluid controlled by the valve;
   b) a tubular secondary section having an axis and a longitudinal wall extending between two spaced ends;
   c) means interconnecting one end of the secondary section to the wall of the main section around the opening in said wall so that said secondary section extends laterally from said wall and said opening;
   d) a control shaft rotatably mounted about an axis transverse to the secondary section and close to the opening in the main section; and
   e) a valve closure element mounted on the control shaft for controlling fluid flow through the opening in the secondary section, said closure element having an outer face that corresponds in configuration to the configuration of the internal surface of the main section wall, said outer face being co-extensive with and locally completing said internal surface of said main section wall when said closure element is in its closed position.

2. A valve according to claim 1 wherein the internal surface of the main section wall is generally cylindrical in configuration, and wherein the face of the closure element has a cylindrical configuration equivalent in radius to that of said internal surface.

3. A valve according to claim 1 wherein the main section wall opening forms an annular seat for the valve closure element, said seat having a surface in the form of a portion of a sphere centered on the intersection of the control shaft axis and the secondary section axis.

4. A valve according to claim 3 wherein said intersection is spaced from the main section axis a distance less than the sum of the radius of the sphere and the distance between the main section axis and the face of the valve closure element when said element is in its closed position.

5. A valve according to claim 3 wherein the valve closure element comprises a butterfly type disk offset from the control shaft axis, said disk having an edge in the shape of a portion of a sphere that is concentric with the spherical surface of the seat.

6. A valve according to claim 3 wherein the seat surface has a diameter greater than the internal diameter of the main section.

7. A valve according to claim 6 wherein the seat surface diameter is between 110 and 150 percent of the main section internal diameter.

8. A valve according to claim 7 wherein the seat surface diameter is between 125 and 135 percent of the main section internal diameter.

9. A valve according to claim 1 including a vent communicating with the secondary section and adapted for connection to an external source of cleaning fluid to facilitate draining said secondary section.

10. A valve according to claim 1 wherein the valve closure element comprises a disk with a substantially flat inner face.

11. A valve according to claim 10 wherein the disk in its open position extends into the main section a distance substantially between one-quarter and one-third of the internal diameter of said main section.

12. A valve according to claim 1 wherein the area of the opening is between 45 and 65 percent of the transverse area of the main section.

13. A valve according to claim 1 wherein the control shaft comprises two separate coaxial sections pivotally mounted in diametrically opposite bores and non-rotatably secured to the valve closure element.

14. A valve according to claim 1 wherein the control shaft axis is perpendicular to the axes of the main and secondary sections.

15. A valve according to claim 1 wherein the means interconnecting the secondary section and the main section comprises a mounting flange on the main section surrounding the opening, an intermediate flange between said mounting flange and the secondary section, and an annular gasket between said mounting flange and said intermediate flange, said gasket functioning as a seal between said mounting and intermediate flanges, and between the valve closure element and the main section when said closure element is in its closed position.

16. A valve according to claim 15 wherein the control shaft is rotatably mounted in the intermediate flange.

17. A valve according to claim 15 including a vent in the intermediate flange for draining the secondary section.

18. A valve according to claim 1 wherein the control shaft axis is spaced from the main section axis a distance of between 75 and 85 percent of the internal diameter of the main section.

* * * * *